United States Patent [19]

Stenlund

[11] Patent Number: 4,572,238
[45] Date of Patent: Feb. 25, 1986

[54] AUTOMATIC ADJUSTING VALVE FOR CONTROLLING FLUID FLOW

[75] Inventor: Stig Stenlund, Saltsjöbaden, Sweden
[73] Assignee: Hep Products AB, Alvsjo, Sweden
[21] Appl. No.: 573,928
[22] PCT Filed: Apr. 22, 1983
[86] PCT No.: PCT/SE83/00156
 § 371 Date: Dec. 22, 1983
 § 102(e) Date: Dec. 22, 1983
[87] PCT Pub. No.: WO83/03882
 PCT Pub. Date: Nov. 10, 1983

[30] Foreign Application Priority Data

Apr. 23, 1982 [SE] Sweden .............................. 8202565

[51] Int. Cl.[4] ............................................ F15B 13/04
[52] U.S. Cl. .................................... 137/625.3; 91/455;
  137/596.17; 137/625.37; 137/625.14;
  137/625.48
[58] Field of Search ..................... 91/455; 137/596.17,
  137/625.3, 625.37, 625.4, 625.48

[56] References Cited

U.S. PATENT DOCUMENTS

| | | | |
|---|---|---|---|
| 3,282,168 | 11/1966 | Hayner et al. | 137/625.62 X |
| 3,757,820 | 9/1973 | Aylesworth | 137/625.3 |
| 4,266,572 | 5/1981 | Schuttenberg et al. | 137/625.63 |
| 4,504,069 | 3/1985 | Stenlund . | |

FOREIGN PATENT DOCUMENTS

| | | |
|---|---|---|
| 2840831 | 4/1980 | Fed. Rep. of Germany . |
| 2029044 | 10/1970 | France . |
| 409494 | 8/1979 | Sweden ........................ 137/596.12 |
| 599472 | 5/1978 | Switzerland . |
| 2101772 | 1/1983 | United Kingdom . |

Primary Examiner—Gerald A. Michalsky
Attorney, Agent, or Firm—Holman & Stern

[57] ABSTRACT

A controlled sliding valve comprises a valve housing with a cylindrical bore, in which a slide controlling a hydraulic flow reciprocates by an adjusting force, the sealing surfaces between the slide and bore form a sealing gap converging in the flow direction, and the amount of flow is controlled between a throttling edge and longitudinal control grooves (7, 8;44) in the slide with variable cross-sectional area in the direction of movement of the slide, and a centering spring retains the slide in closing position. In order to obtain low adjusting forces, to control the volume so as to be substantially constant and independent of the pressure drop over the valve, and to maintain low leakage past the slide, the valve housing includes a central chamber (6) provided with a port (3), and on both sides of the central chamber two control chambers (9, 10) with ports and each with a sealing gap (11, 12) spaced from each other. The central chamber (6) and either of the two control chambers (9,10) communicate in all adjustment positions with the control grooves (7,8), which can be caused to open to only one of the sealing gaps (11 or 12) at a time. The centering spring (13) centers the slide from the positions of movement where there is flow connection between the central chamber (6) and either of the two control chambers (9,10), and the flow direction is in the converging direction of the sealing gaps (18,19) whereby, the hydraulic flow can pass between the central chamber (6) and one of the two control chambers (9,10) at a time in the direction in which the sealing gaps converge in the flow direction.

10 Claims, 5 Drawing Figures

AUTOMATIC ADJUSTING VALVE FOR CONTROLLING FLUID FLOW

BACKGROUND OF THE INVENTION

1. Field of the Invention

This invention relates to a valve means, which adjustably controls the flow direction and the volume flow so that this is substantially constant for each setting and independent of load variations, and where the adjusting can be carried out mechanically by positioning, electrically by a force or positioning, or hydraulically or pneumatically by a pressure, but where the control work can be held so low that one person, for example by a lever, or alternatively a relatively small electromagnet, can control the valve means directly and without auxiliary force. The volume flow passes alternatively, depending on two possible cases, in one case from a pressure source to two alternative sides of, for example, a hydraulic cylinder, and in the other case from one of the two sides of the cylinder to a return conduit, in such a manner that the requirements of low valve leakage and safety in the event of conduit rupture cn be satisfied simultaneously.

2. Description of the Prior Art

Hydraulic directional valves have the object to control the direction of movement and the speed of hydraulic cylinders and rotary motors. The directional valves most commonly used control adjustably the speed, i.e. in this case the volume flow, via adjustable throttlings in the valve. With these valves, the volume flow depends on the size of the load and on the load variations. In order to decrease or eliminate the changes in speed caused by variations in the load, in recent years valves have come into use which are load-independent. These valves maintain at every setting a volume flow independent of the pressure drop through the valve.

Basically, there exist to-day two known principles meeting the requirement of controlling the volume so as to be substantially constant and independent of the pressure drop through the valve.

The oldest principle, most known and applied, is based on two co-operating valves connected in series. One of these co-operating valves controls adjustably the volume flow by adjusting the throttling area through the valve. Thereby, the pressure drop through the throttling area always is maintained constant, and thereby the volume flow passing through the valve for each setting of the throttling area is substantially constant and independent of the pressure drop prevailing through both valves together. The second co-operating valve has the object to automatically throttle the volume flow so that the pressure drop through the adjustable throttling place of the first-mentioned valve is relatively low and most important for a constant pressure drop.

The newest principle, which so far has not been used to a great extent, is based on the capability by one and the same valve function to control a volume flow, which is adjustable, and to maintain for each setting a substantially constant volume flow, which is independent of the pressure drop through the valve. At varying pressure drops through the valve, thus, the prevailing throttling area must vary in such a manner, that the volume flow remains constant for every valve setting. This is effected by so designing the valve means that flow forces are obtained which close the throttling area, and that simultaneously an opening constant adjusting force acts on the valve means, which force determines the volume flow to pass through the valve, and also a non-adjustable spring force from a centering spring acts in the closing direction on the valve means. The throttling area must increase linearly with the movement of the valve means in the respective opening direction. The constant adjustable opening force to-day is brought about hydraulically by causing an adjustable pressure to act on an area, for example the end area of the valve slide.

As regards adjusting the flow direction and the size of the volume flow, two types of application fields can be distinguished. Especially in mobile working machines such as an excavator, loader, hoisting crane etc., the different movements of the machine are controlled by a driver. Especially in industrial manufacturing processes the machine is controlled by electric or, exceptionally, pneumatic control systems. The members attending to the primary adjusting work are the arms and hands of the driver or small electromagnets. The adjusting work within the capacity of these members renders it possible to control only the smallest valves of the respective type, and mostly with only small margins. As soon as the valve size increases, or the adjusting work is desired to be limited, a so-called servo control must be applied. This implies normally, that primarily a small hydraulic valve of pressure reducing type is controlled, which in its turn via pressure controls the main valve and the size of the volume flow. Hereby, of course, the system becomes more expensive and complex.

A directional valve, in addition to controlling the direction and volume flow, has the object to be capable to hold the load motionless, i.e. to efficiently seal hydraulic motors and cylinders both under normal conditions and also from a safety aspect in the event of conduit rupture. This implies that the systems must be designed so as to have a correct system structure, i.e. the components must be positioned correctly, and each component must have the correct function. To-day, in principle two hydraulic systems are designed which have the alternative system structures as follows.

The valves are combined in one block, which is located relatively centrally relative to cylinders and motors. Two high-pressure conduits connect every cylinder or motor to the central block. This structure normally is called central structure. It does not ensure safety at conduit rupture.

The valves are assembled with the respective cylinder or motor. Two main conduits, one for high pressure and supply, and one for low pressure and discharge, are drawn so that every cylinder or motor and its valve are connected. This system normally is called motor structure. This structure can ensure safety at conduit rupture and also efficient sealing of the cylinder or motor.

The valves are assembled in a central block, and every cylinder or motor, in addition, is provided with a valve. Two high-pressure conduits for every function are drawn between the central block and the respective valve on the cylinder or motor. It can here be imagined in principle to design a separate return conduit as a main conduit. This structure is called mixed structure. It can ensure safety in the event of conduit rupture and also an efficient sealing of cylinder or motor.

It can be stated that manual control without servo control practically is possible only with central or mixed structure. The driver must be near the valve. It also is apparent that the safety requirement in the event of conduit rupture can be met only when there is a valve function on the cylinder or motor. It further can be stated that manual control without servo control with the requirement of safety in the event of conduit rupture can be satisfied only with mixed structure. In electric control, without servo control and simultaneously with the requirement of safety in the event of conduit rupture being provided, this can be satisfied both with motor structure and mixed structure. It is here to be distinguished that the requirement of tightness must be met by the valve located on the cylinder or structure, at the same time as the central block in the mixed structure can be loose. The control of the volume flow from the motor or the two pressure sides of the cylinder must occur with the requirement of tightness, while at the mixed structure, and at times also at the motor structure, the requirement of tightness at the control of the volume flow from the pressure source to the two pressure sides is low and dictated by other respects. The sealing between the valve on the motor and the pressure side of the main conduit or the central block is effected by check valves, which simultaneously ensure tightness and safety in the event of conduit rupture.

Commercially available to-day are manually directly controlled valves with mixed structure and volume flow control based on two co-operating valves. The principle of volume flow control via one single valve function is realized only with servo control. This can be explained as follows. In control with two co-operating valves, the driver must overcome only the friction and a weak friction-overcoming return spring at the adjusting of the valve function, which adjusts a certain adjustable throttling area. In the other type with only one valve means, the valve moves in pace with the load variations. It is impossible to control directly on the valve means, because the driver's hand preferably must be motionless, independent of the slide position and dependent only on the selected position of adjustment. It is equally disqualifying, that the adjusting force due to acceptable control accuracy must be set at least ten times higher than the friction force. As the friction force per se already at small valves requires an adjusting work, which is close to the limit permissible at direct control manually or by small electromagnets, it is obvious that the principle with one valve means cannot be applied with the present state of art.

In view of valve volume, weight and cost, the principle with one valve means is most advantageous, which can be utilized in systems with servo control. In most systems it is desired, for cost reasons, to avoid servo control, if possible. Therefore, the principle with two valve means is to-day still the only possible solution.

BRIEF SUMMARY OF THE INVENTION

The present invention has the object to render possible direct control of direction and load-independent volume flow with an adjusting work so low, that it can be carried out manually or via small electromagnets, by utilizing a valve means with only one valve member, in such a manner, that it is possible practically and without extra valves to achieve sufficient valve sealing and the possibility of safety in the event of conduit rupture.

As already mentioned, there is no need in the case of manual control of too high a tightness requirement. In electric control, the tightness requirement also is low when the control is effected on the supply side from the pressure source to the cylinder or motor, irrespective of whether this control is carried out in a centrally located valve or in a valve located on the cylinder or motor. In all of the aforesaid cases, the tightness requirement can be satisfied by the check valve or valves, which simultaneously ensure safety in the event of conduit rupture. When, however, the valve member controls the volume flow between one of the pressure sides of the cylinder or motor and the return conduit, the tightness requirement must be high, because there is no other valve function in this flow direction to take over the sealing function. In this problem, therefore, two different degrees of difficulty can be noticed, because the solution and the invention are based on drastically reducing the friction work in the adjusting of the valve, which implies that the friction of the valve member must be very low in relation to the valves of to-day. Two degrees of difficulty arise when in one difficult case low friction is to be combined with high tightness, and in the second easy case low friction is to be combined with low tightness requirement.

It is, thus, easier to control the supply volume flow in a valve manually or electrically than to electrically control the volume flow to the return conduit.

In the present invention, in both said cases of difficulty the low friction in the valve member is obtained, in that this member is designed as a round slide, which is controlled inward to the center of the slide aperture of the valve housing, in that the sealing gap constituting the sealing between the slide and the housing decreases all the time in the direction of the leakage. It is known per se that a decreasing converging sealing gap has a centering effect, but this is not utilized to-day, as substantially all slides to-day are provided with so-called balancing grooves, which reduce or eliminate this effect, but also the very strong locking effect, which arises when the gap is instead diverging, i.e. increases in the flow direction of the leakage. A natural explanation of that this not utilized, and cannot be utilized, is that conventional valves generally do not have one and the same pressure drop direction, which also results in that the leakage volume flow can flow in two directions and, thus, in one of the directions would lock the slide.

In the present invention, the directional valve proper is designed so that only one single pressure drop direction and one single direction of the leakage volume flow can be obtained. Consequently, the valve always are designed with only three pressure passageways with high pressure difference relative to each other. Only two basic valve types then can be distinguished:

One type comprises a centrally located high-pressure passageway where the pressure always is higher than the pressure in the two outer passageways. This is the typical supply valve, which receives its motor flow from the pump and directs it to either side of the motor or cylinder, generally via check valves located in the valve on the cylinder or motor, whereby simultaneously tightness and safety in the event of hose rupture are obtained. This valve type may also have two additional low-pressure passageways-tank passageways located outside the two outer pressure passageways.

The second type comprises a centrally located low-pressure passageway, which is surrounded by two passageways communicating directly with the respective pressure side of the cylinder or motor without intermediate throttlings or sealing valves. It is obvious that the two outer passageways always have a higher pressure than the centrally located low-pressure return passageway. This is the typical discharge valve. The valve as such must be tight, if the total valve function is to be capable to hold the load. As this valve function must be placed on the cylinder or motor without intermediate conduits for providing safety in the event of conduit rupture, generally only electric direct control is of interest. This valve, of course, also can be controlled pneumatically or hydraulically, but then there is no need of very low adjusting work.

In converging sealing gaps the slide is centered in the bore by the pressure distribution about the same, so that an oil film is formed all about. The friction is then acceptably low. When the low friction must be combined with the requirement of low leakage, the clearance between slide and valve housing must be very small. This cannot be achieved safely in a conventional sliding valve, because deformation of the valve housing and heat expansion generally give rise to jamming of the slide and friction.

By utilizing the Swedish patent application SE No. 8202564-4, filed Apr. 23, 1982, which corresponds to copending U.S. Pat. No. 4,504,069 (see FIGS. 5 and 6), however, a slide valve can be obtained which simultaneously satisfies the requirements of low leakage and low friction. This invention also is based in principle on one single pressure drop direction and a converging sealing gap, which centers the slide to a central position with low friction, but here temperature deformations and pressure deformations can be permitted, at the same time as the sealing function automatically adjusts itself to the demand of small leakage gaps between the slide and its surrounding.

Conclusively it can be said, that systems with a mixed structure as well as with motor structure with supply control can be obtained by valves designed according to the relatively conventional embodiment, while motor structure and discharge control require an unconventional new sealing principle according to the invention. It is clear, however, that the new improved sealing principle always is an improvement of the present invention, because the adjusting work can be reduced. This results in better properties in the manual case and in electric control, where also the costs can be reduced owing to the lower adjusting work and the lower adjusting force.

As the slide moves in pace with the pressure drop change, the driver's lever cannot act directly on the slide, as is the case with the conventional principle with two co-operating valve functions. An electromagnet, however, can follow the slide. The problem to be solved, therefore, is the manual control. In the present invention, this problem is solved in a surprisingly simple way, in that a control spring acts on the slide in the opening direction, i.e. against the centering spring and also against the closing flow force. The free end of said control spring is moved by the driver via the control lever to different positions, each of which yields a valve adjustment and a substantially load-independent volume flow. The explanation of this simple, and from a cost aspect favorable solution of this problem is that the slide now is actuated by a constant force and a centering force from the two spring forces acting against each other. The new spring constant, which according to what was said earlier in this description must be adjusted to the linear area function and flow force, is the constant which is brought about by the two springs together when they connected in parallel operate against one another. It is here to be observed that it is the lever position, i.e. the position of the motionless end of the adjusting spring, which determines the adjustment and the arising volume flow. This implies, that the force in the spring varies slightly, in response to the positions of the slide. At a high pressure drop over the slide, the slide tends to close, thereby increasing the force in the spring. The driver to some extent can perceive this change in the force for each lever adjustment, and thereby simultaneously receives certain information on the load variations.

The control spring also can be used with electric control, as long as the control signal is corresponded either by a correct control position for the motionless control side of the spring, or the force acting on the slide is constant and corresponding to the desired control force. In other words, it is possible in some way to position the control position of the control spring via an electric motor of optional type or, for example, to use a control spring and an electromagnet, which have been so adjusted relative to each other that the total result is alternatively a constant control position for the control spring or a correct constant force in the control spring. In both cases, of course, the total spring constant acting on the slide must be adjusted correctly to the remaining pertinent properties.

A third possibility is to permit the control position of the control spring, when it is controlled by an electromagnet, to slightly vary in pace with the slide movement, and to compensate for this by adjusting alternatively the total spring constant, flow force or speed of area change, so that the total result is optimized in respect of small volume flow variation with pressure drop variations.

BRIEF DESCRIPTION OF THE DRAWINGS

Two embodiments of one supply valve and one discharge valve will now be described in detail, with reference to the accompanying drawings, wherein.

DETAILED DESCRIPTION

Figure 1:
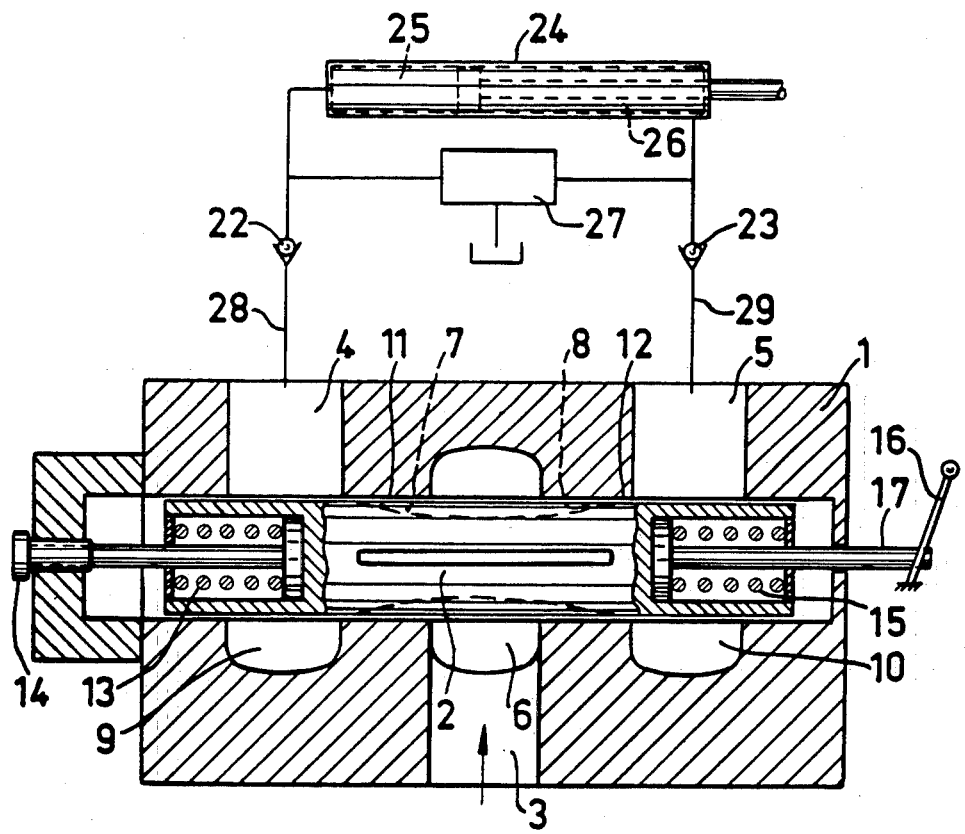
FIG. 1 is a schematic cross-sectional view of a control valve where manual volume flow is directly controlled to one of two alternative passageways, each of which via a check valve communicates, for example, with a hydraulic cylinder, which valve, thus, is a supply valve.

In FIG. 1 the valve housing is designated schematically by 1. It comprises a reciprocating slide 2 and is provided with an inlet port 3 and two outlet ports 4 and 5. The flow from the inlet port 3 to the outlet ports 4 and 5 is controlled by the slide 2, in such a manner, that on the sides of the inlet space 6 a number of grooves 7 and 8 are located, which in a certain position of the slide 2 permit flow from the inlet 3 to alternatively the outlet spaces 9 and 10, from where the flow freely can pass to the outlet ports 4 and 5.

The size of the flow, i.e. the size of the flow Q, is determined by the flow area formed between the grooves 7 and 8 and the sealing edge 11 and 12. The grooves have a depth increasing toward the inlet space 6. This implies, that one of the areas increases its opening area with increasing movement of the slide 2 in the direction from the centered position. A certain minimum slide movement is required before any of the grooves 7 or 8 starts to open an area between the inlet space 6 and the outlet spaces 9 and 10, respectively.

The size of the flow area, thus, is varied by adjusting the slide 2. The slide is held in closed centered position by the double-acting spring device 13 in known manner, which also comprises an adjusting device 14 for adjusting the position of the slide 2 in the center. Against the other end of the slide in the respective direction of movement a control spring device 15 acts which also is double-acting in known manner. Upon tightening the control spring 15, it acts against the slide for the respective direction in opening direction and against the centering spring 13, which acts in the closing direction. The control spring has a fixed end position for each adjustment of the control lever 16, which position follows the position of the control axle 17. Calculated from the central position, the slide now is actuated in the respective direction by a constant opening force and a centering force, which consists of the total force from the centering spring 13 and control spring 15. The total resulting spring coeffcient is the sum of the coefficients of the two springs acting on the slide, i.e. from the centering spring 13 and control spring 15. As has become apparent from the aforesaid, the centering spring 13 tends to move the slide to the central closed position, where the grooves 7 and 8 have no connection to the outlet passageways 4 and 5 via the throttling edges 11 and 12. As mentioned, the valve operates alternatively with volume flow to two outlet ports 4 and 5 from the inlet port 3 and, thus, for each alternative in only one flow direction. Therefore, the volume flow alternatively can pass through the check valves 22 and 23, thereby preventing leakage from the two pressure sides 25 and 26, respectively, of the cylinder 24. The object is that the valve shall yield a certain substantially constant volume flow, i.e. volume flow through per time unit independently of the pressure drop over the throttling place, alternatively at the grooves 7 and 8 and the sealing edge 11 and, respectively, 12. This is achieved at the valve in that a force acts on the valve which originates from the flowing medium passing through the grooves of the slide. This force actuates the slide 2 in the closing direction and is dependent on the volume flow Q and the pressure drop over the slide. In a previously known way, the size of the flow force can be adjusted by designing the grooves of the slide and the flow passageways or flow spaces of the valve housing so that they, in coordination with a correctly adjusted total centering force from the springs 13 and 15 and the change in size of the opening area with the stroke of the slide, yield a constant volume flow, which only to a small degree is changed with the pressure drop over the slide. This proceeds in such a way, that the control spring tending to open the flow area is counteracted by both the centering spring and flow force, in such a manner, that irrespective of whether the volume flow Q or the pressure drop over the slide, for example, should increase, the flow force increases, and the flow area thereby tends to decrease, resulting in the volume flow being maintained substantially at the value set. When the operator desires a higher volume flow, he increases the lever deflection, whereby the slide opens a greater flow area, but at the same time the flow force increases and counteracts the greater flow area.

Figure 2:
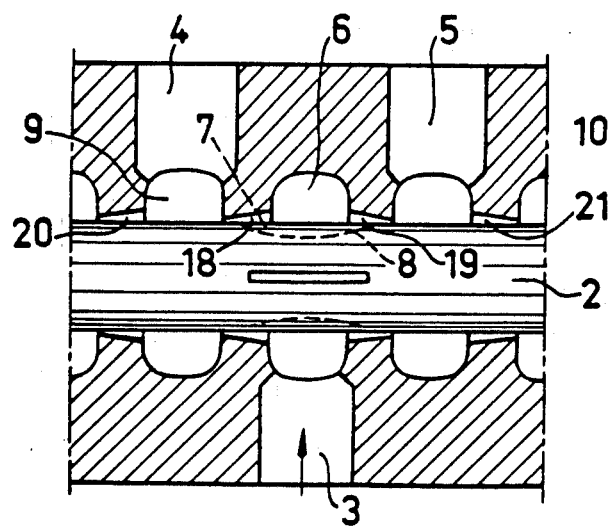
FIG. 2 is a view similar to FIG. 1 which shows in principle on an exaggeratedly enlarged scale co-operating sealing surfaces.

For rendering the slide easily controlled manually by an operator at the control spring, the spring is required to work smoothly, i.e. to have low friction. This is achieved, as FIG. 2 shows, in that the sealing gaps 18 and 19 between the pressure passageway 6 and the outlet spaces 9 and 10 are designed tapering or conical in the direction toward the lower pressure. This applies also to the sealing gaps 20 and 21, which seal the outlet spaces 9 and 10 against the surrounding outer ends of the housing 1. In all sealing places 18,19,20 and 21 a small volume flow passes from the higher to the lower pressure, whereby the sealing gap always decreases in the direction of the flow. In a previously well known way, the slide 2 is centered in the housing 1 so that an overall extending oil film is formed in the gaps 18,19,20 and 21, thereby yielding liquid friction only at the movement of the slide 2 in the valve housing 1.

The springs 13 and 15 now can be chosen so weak that this can yield an acceptable force and an acceptable adjusting work at the adjusting of the volume flow of the valve via compressing the adjusting spring 13. One consequence thereof is that also the flow force acting in the closing direction on the slide 2 must be dimensioned low.

A supply valve according to FIG. 1 can be combined with a discharge valve connected as 27 as shown in the figure. As the check valves 22 and 23 can be designed tight, and are tight irrespective of whether the conduits 28 and 29 are intact or not, leakage out of the two pressure sides 25 and 26, respectively, of the cylinder 24 can flow only via the discharge valve 27, which thus is required to have high tightness, while the supply valve shown cannot be actuated by the leakage from the cylinder and, thus, is not required from this aspect to be tight.

Figure 3:
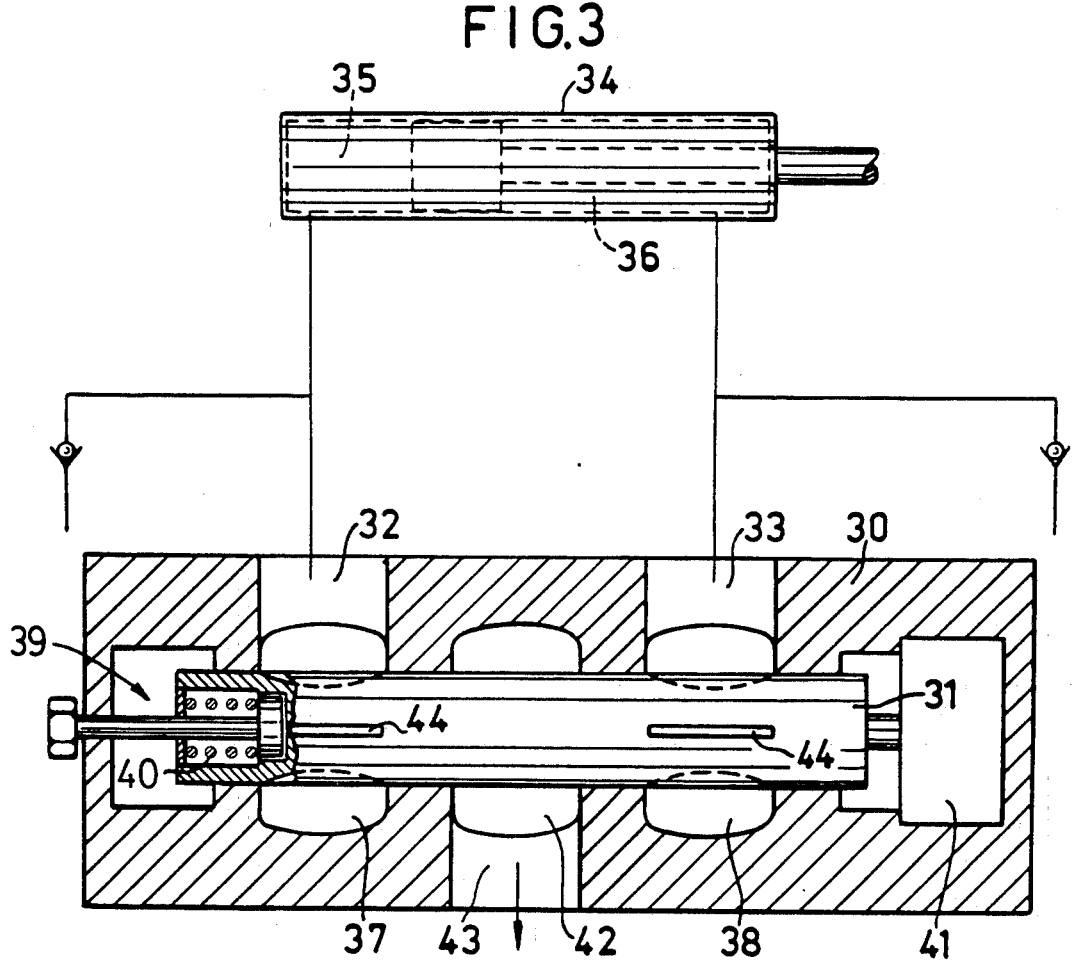
FIG. 3 is a schematic cross-sectional view of a different embodiment of the control valve where electrically, via an electromagnet, volume flow is directly controlled to a tank conduit from one of two alternative passageways, which communicate, for example, with a hydraulic cylinder, which valve, thus, is a discharge valve.

In the electrically controlled discharge valve shown in FIG. 3, the valve housing is designated by 30, and the slide by 31. The valve comprises two alternative inlet ports 32 and 33, which communicate with the two pressure sides 35 and 36, respectively, of the cylinder 34 and with the flow spaces 37 and 38, respectively. The slide 31 is actuated by a centering mechanism 39, which is double-acting in known manner and comprises a centering spring 40, and by a double-acting electric motor 41, which delivers the substantially constant adjusting force, by which a volume flow Q substantially constant for each setting is effected from the flow passageways 37 and 38, respectively, to the outlet flow passageway 42, which communicates directly with the outlet connection 43, which in its turn is in direct communication with the pressure conduit or tank conduit not shown. The flow passes via the grooves 44 in the slide which upon movement of the slide from its central position alternatively open a flow area from the flow space 37 or 38, respectively, to the outlet space 42. The control of the flow is effected in principle according to the description with reference to FIG. 1.

Figure 4:
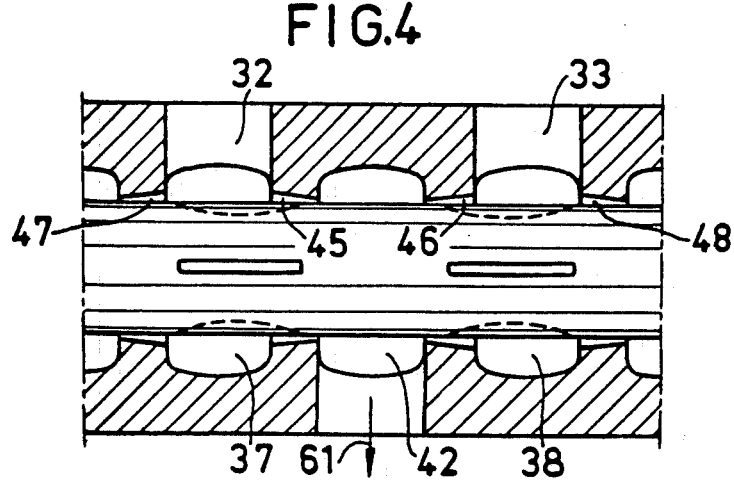
FIG. 4 is a view similar to FIG. 3 which shows in principle on an exaggeratedly enlarged scale co-operating sealing surfaces.

FIG. 4 shows how the sealing gaps 45 and 46, respectively, and 47 and 48, respectively, are designed with decreasing gap from the pressurized flow spaces 37 and 38, respectively, outwardly to the lower pressure areas of the surrounding housing.

Figure 5:
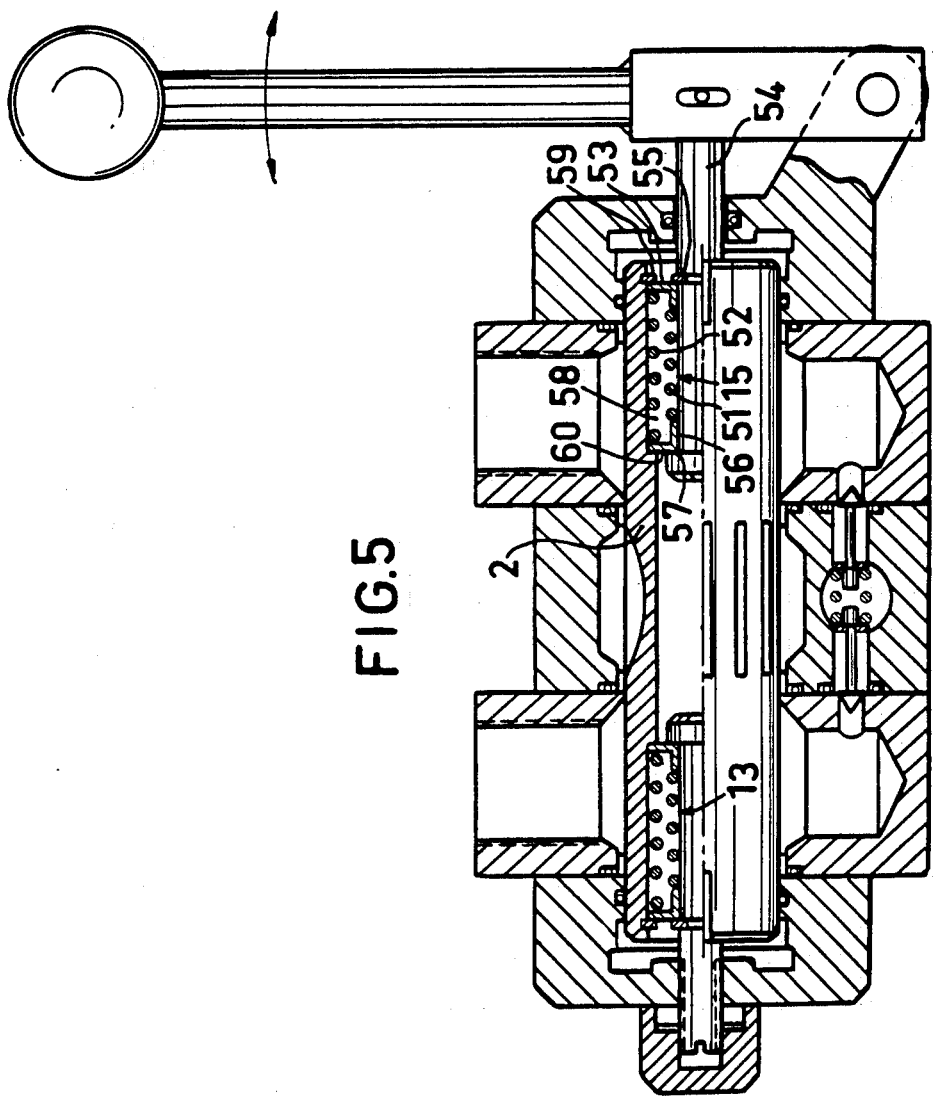
FIG. 5 is a schematic cross-sectional view in longitudinal direction of the control valve, showing the centering spring and adjusting spring more clearly.

In FIG. 5 the design of the adjusting spring 15 and centering spring 13 are shown. Since the design is identical for both of them, the description is restricted to the adjusting spring 15. It comprises two co-operating concentrically located springs 51 and 52. The right-hand end of the spring 51 abuts a stop ring 53 retained by means of a locking ring 55 on adjusting axle 54, but which is freely movable to the left. The left-hand end of the spring 51 abuts in a similar way a second stop ring 56, which is locked against movement to the left relative to adjusting axle 54 by means of a locking edge 57.

The spring 52, thus, is located about the spring 51, and its right-hand end also abuts said first mentioned stop ring 53, which is freely movable to the left relative to the slide 2, in that the entire spring device inclusive of the stop rings 53 and 56 is located in a central cavity 58 in the right-hand end of the slide. The adjusting axle 54 projects into the cavity 58. The stop ring 53 is prevented from being moved to the right in the cavity past a second locking ring 59 inserted in a groove in the wall of the cavity 58.

The left-hand end of the spring 52 abuts the left-hand stop ring 56, which is freely movable relative to the slide to the right in the cavity 58, but its movability to the left is further restricted by a stop edge 60 formed in the cylindrical surface of the cavity.

The function of the spring device is as follows. When the adjusting axle 54 is moved into the slide 2, and thus to the left, the slide is moved to the left by force transfer via the locking ring 55, stop ring 53, springs 51 and 52, stop ring 56 and stop edge 60. When the adjusting axle is drawn to the right, the adjusting force is transferred from the adjusting axle to the slide via the locking edge 57, stop ring 56, springs 51 and 52, stop ring 53 and locking ring 59. The spring force of the spring device is determined by the individual spring characteristics of the springs 51 and 52.

As in the electrically controlled discharge valve low slide friction and low slide leakage are required simultaneously, the central sealing gap decreasing in the leakage direction must be designed so as at increasing pressure to decrease its clearance or to maintain its small clearance, and at the same time the sealing gap must accomodate the valve housing being deformed, and in addition the details comprising the valve and sealing gap must accomodate deformation due to temperature variations and temperature differences. Such as embodiment is described in the Swedish patent application SE 8105177-3.

In addition to the advantages of the invention over known art as mentioned above in the introductory portion, it is to be pointed out that previously known principles comprise a greater number of and more complicated details, which generally, owing to their complicated flow passageways, are limited to cast embodiments such as cast iron. In the present invention, the passageways are simple and suitable for many manufacturing methods and also for a relatively free material choice. It is very easy and advantageous to design the valves for load-sensing where the system pressure is well adjusted to the pressure demand in the system, so that all valves according to the present invention can be provided with all advantages known at present and, in addition, with the new and valuable advantages rendered possible by the invention.

I claim:

1. In a controlled sliding valve including a valve housing with a cylindrical bore therein in which a slide member controlling hydraulic fluid flow reciprocates, the sealing surfaces between the slide member and bore form a sealing gap preventing fluid flow along the slide from one end of said surfaces to the second end of said surfaces wherein the gap converges from said one end to said second end, throttling edges and longitudinal flow control grooves in the slide member with variable cross-sectional area in the direction of movement of the slide member for controlling flow along the slide, a centering spring for resiliently urging the slide member toward the closing position, a central chamber in the housing and the bore with a port, a control chamber in said housing on each side of the central chamber communicating with a respective port and the bore, and sealing edges for each chamber in relative spaced relationship, the improvement comprising;

the central chamber communicates with either one of the control chambers through the flow control grooves in all adjusted positions;

said flow control grooves can be caused to open to only one of the sealing edges at a time;

the centering spring urges the slide member to return to the closing position from the adjusted positions where there is flow through the flow control grooves between said central chamber and one of said control chambers, the direction of said flow being in the converging direction of said sealing gaps; and means to apply an opening adjusting force on said slide member in a direction opposite to the direction in which said centering spring urges said slide member;

so that the flow area through the valve is automatically adjusted by the force in the closing direction produced by the flow coupled with the combined forces of said centering spring and said opening adjusting force to maintain a substantially constant flow irrespective of pressure drop through the valve.

2. A valve as claimed in claim 1 wherein said means to apply an opening adjusting force comprises:

an adjustable control member mounted on said housing for relative movement with respect thereto; and a control spring means operatively mounted between said slide member and said control member so that movement of said control member varies the force of said control spring on said slide member.

3. A valve as claimed in claim 2 wherein:

an axial bore is provided in said slide member;

said adjustable control member comprises a rod member having one end thereof extending into one end of the bore in said slide member;

an adjusting arm is pivotally mounted on said housing and pivotally connected to the other end of said rod member so that pivotal movement of said arm reciprocates said rod member;

spring retaining means are operatively mounted on said rod member in said bore in the slide member in relative spaced relationship and movable with respect to said rod member and said slide member; and said control spring means is operatively mounted between said spaced retaining means.

4. A valve as claimed in claim 3 wherein said retaining means comprises:

a first stop ring slidably mounted on said rod member and slidable in said slide member bore;

a first retaining spring on said rod member and a second retaining spring in said slide member bore each in abutting relationship with said first stop ring;

a second stop ring slidably mounted on said rod member in axial spaced relationship to said first stop ring and slidable in said slide member bore; and a first retaining shoulder on said rod member and a second retaining shoulder on said slide member in said bore thereof in abutting relationship with said second stop ring;

so that said slide member is axially movable in both directions in said bore in the housing against the force of said centering spring and said control spring means.

5. A valve as claimed in claim 2 wherein said means to apply an opening adjusting force further comprises:

electric motor means mounted on said housing and operatively connected to said control member to actuate said control member to vary the force of said control spring means.

6. A valve as claimed in claim 5 wherein said electric motor means comprises:

a linear double-acting electromagnetic means.

7. A valve as claimed in claim 1 wherein the fluid flow is controlled from said central chamber to said control chambers, and further comprising, a check valve operatively connected to each port of each control chamber opening in the direction outwardly of each said port.

8. A valve as claimed in claim 1 wherein:

said sealing gaps are pressure and temperature independent;

fluid leakage through said sealing gaps is low; and friction force acting on said slide member due to deformation of the valve and valve parts is eliminated even at the highest fluid pressure to which the valve is subjected.

9. A valve as claimed in claim 1 wherein said means to apply an opening adjusting force comprises:

an adjustable control member mounted on said housing for relative movement with respect thereto and operatively connected to said slide member so that movement of said control member and controls the position of said slide member;

electric motor means mounted on said housing and operatively connected to said control member to actuate said control member.

10. A valve as claimed in claim 9 wherein said electric motor means comprises:

a linear double-acting electromagnetic means.

* * * * *